A. N. ALLEN.
WATER TROUGH.
APPLICATION FILED APR. 9, 1917.
1,278,285.
Patented Sept. 10, 1918.
2 SHEETS—SHEET 1.
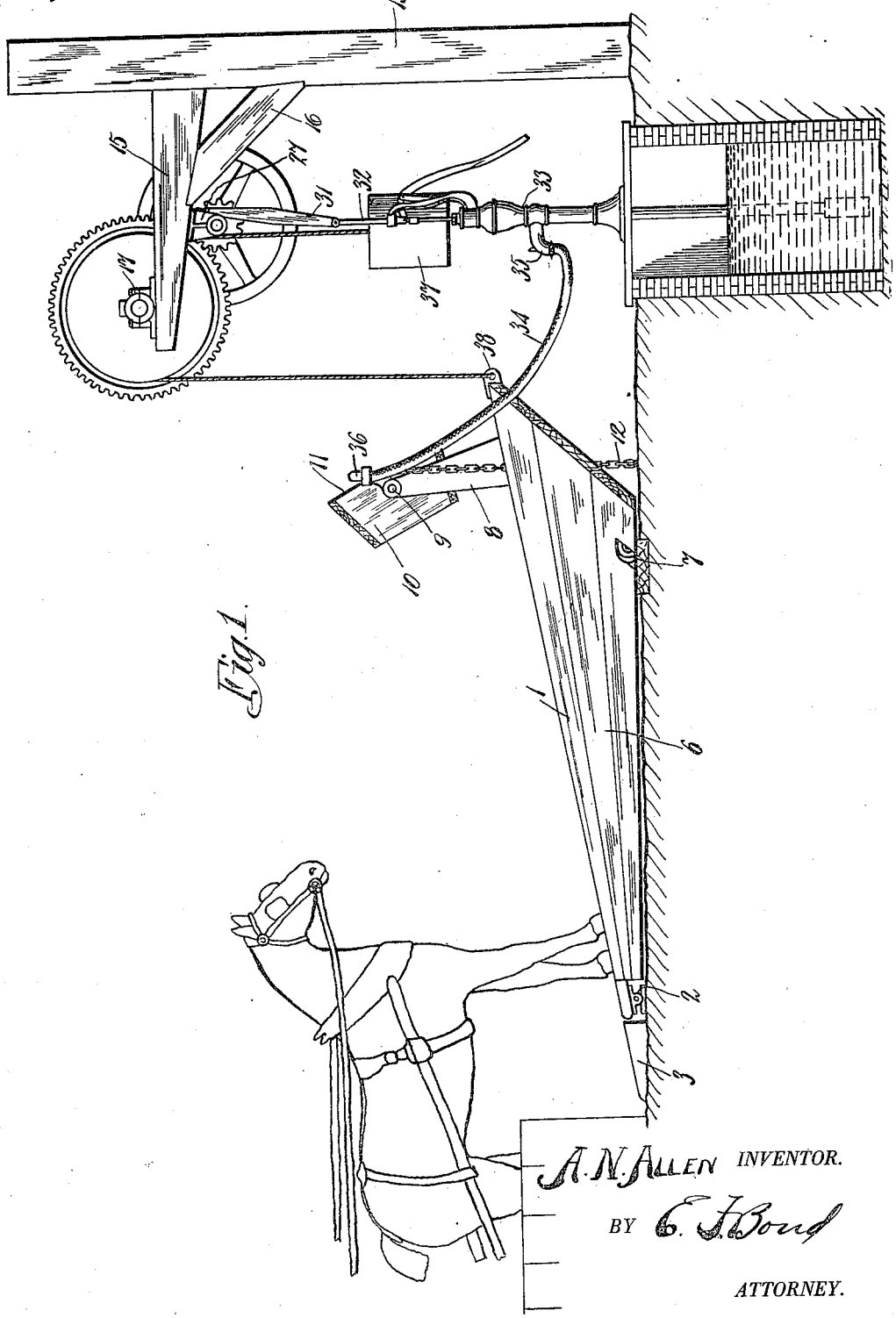
A. N. ALLEN INVENTOR.
BY E. J. Bond
ATTORNEY.

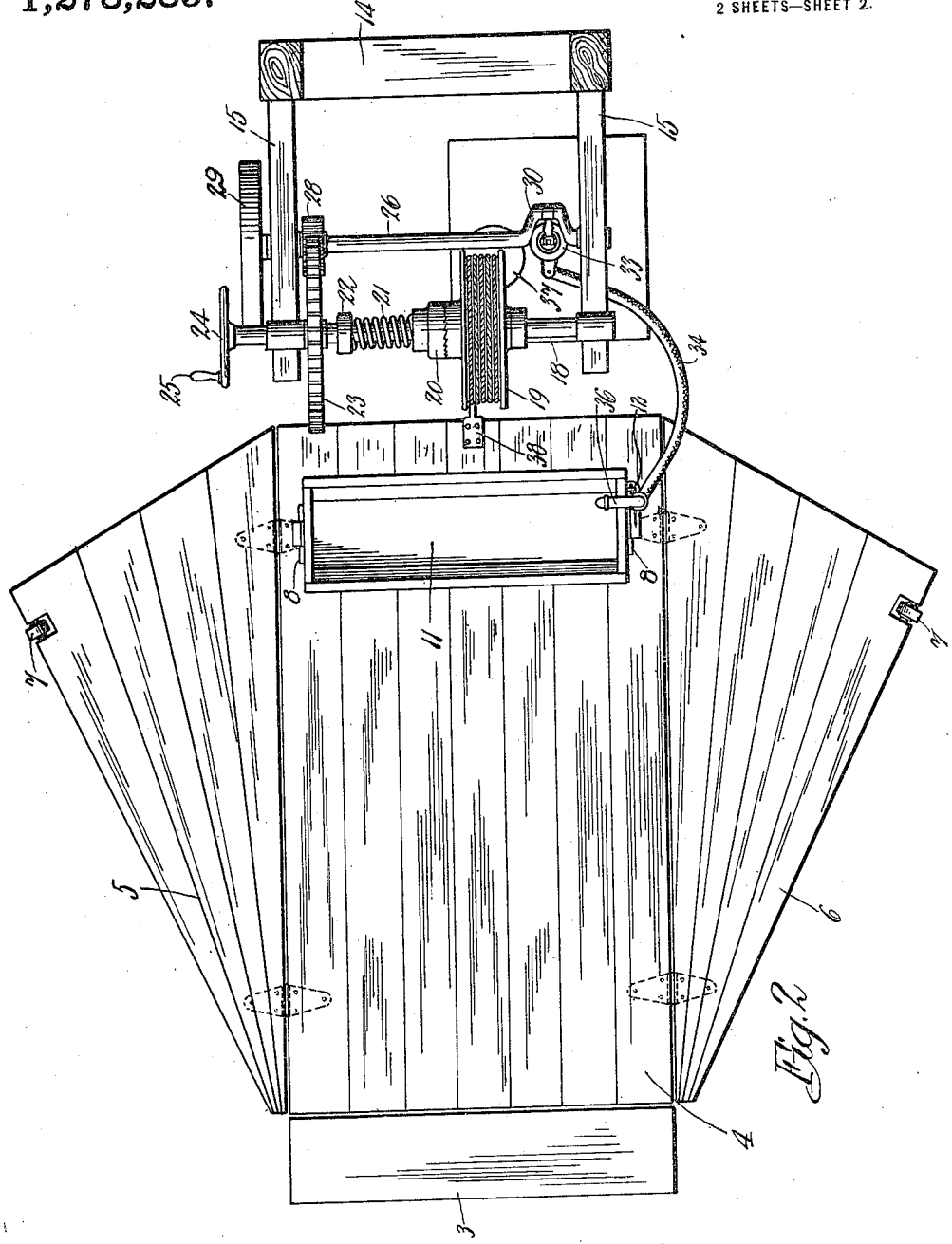

UNITED STATES PATENT OFFICE.

AUGUST N. ALLEN, OF GREEN BAY, WISCONSIN.

WATER-TROUGH.

1,278,285.         Specification of Letters Patent.         Patented Sept. 10, 1918.

Application filed April 9, 1917.   Serial No. 160,813.

*To all whom it may concern:*

Be it known that I, AUGUST N. ALLEN, a citizen of the United States of America, residing at Green Bay, in the county of Brown and State of Wisconsin, have invented certain new and useful Improvements in Water-Troughs, of which the following is a specification, reference being had therein to the accompanying drawing.

The invention relates to water troughs and its principal object consists in providing a water trough and associated parts, whereby upon the approach of any animal the water trough is filled with water.

A further object constitutes the arrangement of a water trough ordinarily in tilted position and placed in operative position upon the approach of an animal, so that a fresh drink is provided for each animal.

To the accomplishment of the general objects stated and others which will more fully appear, the preferred embodiment of the invention consists in the construction and arrangement of parts to be described, illustrated in the accompanying drawings, and defined in the appended claim. In said drawings, Figure 1 is a side view of the water trough and its associated elements, and Fig. 2 is a plan view of the same.

Referring to the drawings, 1 designates a platform tiltably mounted on the ground, as at 2, and maintained normally in slanting position by the arrangement hereinafter further described. A step 3 is arranged in advance of said platform 1, so as to prevent tripping of the animal when approaching the trough. The platform 1 comprises a central plate or board 4, to which are hinged lateral boards 5 and 6. At the lower edge of the lateral boards a roller 7 is provided forming a support for the boards on the ground, and adapted to facilitate movement of the boards when the platform is lowered by reason of the weight of an animal standing on the platform. The middle plate 4 is equipped with two vertical standards 8 forming bearings for pins 9 projecting from the end plates 10 of the water trough 11. The water trough is maintained ordinarily in tilted position by a chain 12, which is connected, as viewed in Fig. 1, to the right of the pivoted pin 9, with the end plate 10 of the water trough, while the other end of the chain is secured to the ground, care being taken that the length of the chain is such that it is kept taut when the platform occupies its uppermost position. Adjacent the platform and at suitable distance therefrom, uprights 13 are secured which are interconnected by braces 14 and thus constitute a vertical frame with brackets 15 supported by braces 16 connecting the middle portion of the brackets with the uprights 13. Bearings 17 are arranged at the free ends of the brackets 15 and receive a shaft 18, upon which a drum 19 is loosely mounted. One end of the hub is formed with clutch teeth adapted to be engaged by correspondingly shaped teeth of a clutch collar 20 splined to the shaft 18 and ordinarily maintained in engaging position by means of a spring 21 interposed between the collar 20 and a collar 22 fast upon the shaft 18. The shaft 26 is journaled in bearings 27 mounted and carries at its terminal portion a hand wheel 24 provided with a crank 25 for a purpose hereinafter further explained. A crank shaft 26 is journeled in bearings 27 mounted to the underside of brackets 15 has a toothed wheel 28 fast thereon and in mesh with the toothed wheel 23 of the shaft 18. The terminal portion of the crank shaft 26 is equipped with a fly-wheel 29 to insure uniform and continued operation of the crank shaft when a certain momentum has been imparted thereto. The crank 30 is articulated with a link 31, which is pivoted to the pitman 32 of a pump 33, so that rotation of the crank shaft 26 will actuate the pump. A hose 34 connects the discharge spout 35 of the pump with the pipe 36 opening into the trough 11. The platform 1 is maintained in raised position by a weight 37 attached to one end of a rope wound around the drum 19 and secured with its other end to the platform, as at 38.

From the foregoing the operation of the device is readily understood:

The platform 1, upon the approach of the animal and under its weight is lowered and the lateral boards 6 assume the position indicated in Fig. 2. The trough being mounted on the platform is lowered simultaneously therewith, and due to the sag of the chain 12 the trough swings about the pivot pins 9 to assume the horizontal position, in which it is capable of holding a certain quantity of water. The weight of the animal overcoming the counterweight 37 forces the latter upwardly, so that the shaft 18 is rotated in counterclockwise direction. The rotation of the shaft is transmitted by the intermeshing gears 23, 28 to the crank shaft 26, and the latter actuates the pump to force water into the trough 11. The initial movement of the crank shaft will be increased by reason of the fly wheel 29, when the latter gains its momentum, so that the crank shaft 26 will be rotated at a higher speed than the shaft 18, whereby disengagement between the clutch elements is caused, the collar 20 being moved longitudinally in opposition to the tension of the spring 21. This rotation of the crank shaft will then be continued for a while, even when the platform already has reached its lowermost position, so that a complete filling of the trough is insured. As soon as the animal leaves the platform, the weight 37 drops, thereby raising the platform to the position indicated in Fig. 1.

Instead of providing a single platform and a trough, it is, of course, within the scope of the invention to provide several platforms and a corresponding number of troughs to be filled from a common pump.

The drawings illustrate the preferred embodiment of the invention, but it is not my intention to confine myself to the details shown, but rather to avail myself of any departures which fairly fall within the scope of the invention. Thus, instead of the pump shown, a rotary pump may be used suitably driven by means of a belt from the shaft 26, and many other variations and modifications may be devised, all of which I intend to include in the scope of the invention, as defined in the appended claim.

I claim:—

In combination with a pump, a movable platform normally in slanting position, a trough on said platform, a chain adapted to maintain said trough in tilted position when the platform is in the slanting position, a shaft suitably supported above the platform, a drum on said shaft, a weight suspended from said drum and connected to the platform, a crank shaft, driving connections between said shaft and said crank shaft, means interconnecting the crank shaft and the pump, and means for disengaging the drum from said shaft upon the stopping of the main shaft.

In testimony whereof I hereunto affix my signature.

AUGUST N. ALLEN.

Copies of this patent may be obtained for five cents each, by addressing the "Commissioner of Patents, Washington, D. C."